(12) United States Patent
Ahmed et al.

(10) Patent No.: US 12,398,308 B2
(45) Date of Patent: Aug. 26, 2025

(54) METHOD FOR REDUCING HYDROGEN SULFIDE (H2S) CONTENT OF H2S-CONTAINING SUBTERRANEAN FORMATION

(71) Applicant: KING FAHD UNIVERSITY OF PETROLEUM AND MINERALS, Dhahran (SA)

(72) Inventors: Ashraf Hashim Babiker Ahmed, Dhahran (SA); Salaheldin Mahmoud Ahmed Elkatatny, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/748,665

(22) Filed: Jun. 20, 2024

(65) Prior Publication Data
US 2025/0109330 A1    Apr. 3, 2025

Related U.S. Application Data

(60) Provisional application No. 63/587,314, filed on Oct. 2, 2023.

(51) Int. Cl.
*C09K 8/532*  (2006.01)
(52) U.S. Cl.
CPC .......... *C09K 8/532* (2013.01); *C09K 2208/12* (2013.01); *C09K 2208/20* (2013.01); *C09K 2208/28* (2013.01)
(58) Field of Classification Search
CPC ................ C09K 8/532; C09K 2208/12; C09K 2208/20; C09K 2208/28
See application file for complete search history.

(56) References Cited

U.S. PATENT DOCUMENTS

| | | | |
|---|---|---|---|
| 11,359,125 B2 | 6/2022 | Al-Yami et al. | |
| 11,591,508 B2 | 2/2023 | Davis et al. | |
| 11,746,278 B1 | 9/2023 | Onaizi | |
| 2020/0332170 A1* | 10/2020 | Santra | C01B 32/162 |
| 2024/0336827 A1* | 10/2024 | Ahmed | E21B 41/02 |

FOREIGN PATENT DOCUMENTS

| | | |
|---|---|---|
| CN | 111676004 A | 9/2020 |
| CN | 111269701 B | 10/2022 |

OTHER PUBLICATIONS

Asraf (Ashraf Ahmed et al., New application of Micromax in aqueous drilling fluid as a hydrogen sulfide scavenger, Geoenergy Science and Engineering, 2023, 229, 212137 (1-6)).*
Product Data Bulletin (downloaded on Oct. 29, 2024).*

* cited by examiner

*Primary Examiner* — Kumar R Bhushan
(74) *Attorney, Agent, or Firm* — Oblon, McClelland, Maier & Neustadt, L.L.P.

(57) ABSTRACT

A method for reducing hydrogen sulfide ($H_2S$) content of a $H_2S$-containing subterranean formation includes drilling the $H_2S$-containing subterranean formation to form a wellbore therein, injecting a drilling fluid composition into the wellbore during the drilling and circulating the drilling fluid composition in the wellbore, and recovering a product stream from the $H_2S$-containing subterranean formation. The drilling fluid composition includes 0.01 to 0.5 wt. % of manganese tetroxide, based on the total weight of the drilling fluid composition. The manganese tetroxide is in the form of spherical-shaped particles having an average particle size ($D_{50}$) in a range of 0.5 to 2 micrometers (μm), and a BET surface area of 2 to 3 meter square per gram ($m^2/g$) of the manganese tetroxide.

17 Claims, 5 Drawing Sheets

METHOD FOR REDUCING HYDROGEN SULFIDE (H2S) CONTENT OF H2S-CONTAINING SUBTERRANEAN FORMATION

CROSS-REFERENCE TO RELATED APPLICATIONS

This application claims the benefit of priority to U.S. Provisional Patent Application No. 63/587,314, having a filing date of Oct. 2, 2023, which is incorporated herein by reference in its entirety.

STATEMENT REGARDING PRIOR DISCLOSURE BY THE INVENTORS

Aspects of this technology are described in A. Ahmed, S. Elkatatny, and S. Onaizi "New application for Micromax in aqueous drilling fluids as a hydrogen sulfide scavenger" published in Geoenergy Science and Engineering, Volume 229, 212137, which is incorporated herein by reference in its entirety.

BACKGROUND

Technical Field

The present disclosure is directed to a scavenger, and particularly to, a hydrogen sulfide ($H_2S$) scavenger to reduce $H_2S$ content in a $H_2S$-containing subterranean formation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Hydrogen sulfide ($H_2S$) is a colorless, acidic, toxic, corrosive, and flammable gas that poses significant risks in various industrial processes. This reactive gas can dissolve in water, oil, alcohol, and other solvents, presenting challenges in different environments. The $H_2S$ gas is naturally formed in underground formations from diverse sources. The natural occurrence of $H_2S$ in the formations stems from geological sources or sulfate reduction by anaerobic sulfate-reducing bacteria. Additionally, the thermal cracking of sulphur-containing compounds may result in the generation of $H_2S$. Thus, it is common to encounter $H_2S$ gas during oil and gas wells drilling operations. The exposure of working personnel to this lethal gas could result in severe health and safety issues, including irritation, lung failure, unconsciousness, collapse, and death. $H_2S$ is highly corrosive due to its acidic nature. It can cause various corrosion problems such as sulfide-stress cracking and pitting. It may also result in hydrogen embrittlement where elemental hydrogen diffuses through the surfaces of pipes. Moreover, the deposition of iron sulfide, a byproduct of corrosion, may lead to under-deposit corrosion and the potential blockage of pipes. In drilling operations, the infiltration of $H_2S$ into the drilling fluid influences the viscosity, density, and fluid loss, thereby causing well-control issues. Additionally, the mud's pH is lowered, which increases its corrosiveness. Accordingly, encountering $H_2S$ during drilling operations may result in substantial financial losses and health and safety penalties if not effectively mitigated in situ.

Aqueous, non-aqueous, and gaseous-based drilling fluids are three types of drilling fluids used in drilling operations. Aqueous-based drilling fluids are the most prevalent due to their cost-effectiveness and favourable technical and ecological performance. The formulation of suitable aqueous drilling fluids necessitates the incorporation of various additives. These additives should fulfil their intended functions while maintaining the desired mud properties. In scenarios where the geological formation being drilled is anticipated to contain $H_2S$, it becomes essential to include $H_2S$ scavengers in the drilling mud formulations. The presence of these $H_2S$ scavengers may remove the $H_2S$ at the downhole, preventing its ascent to the surface. These scavengers react with $H_2S$, forming inactive or less harmful compounds. An efficient $H_2S$ scavenger should have a high scavenging capacity and exhibit swift and complete interaction with $H_2S$, even at modest treatment scales and across a broad range of temperature and pressure circumstances. The scavenger should not impact the mud's characteristics, and the scavenging reaction should not yield harmful byproducts. $H_2S$ scavengers can exist either in liquid form, functioning as $H_2S$ absorbents, or as solids that adsorb $H_2S$.

Various scavengers have been utilized, each presenting benefits and drawbacks. Common considerations for their application include reactivity, scavenging mechanisms, operating conditions, cost, health and environmental risks, and impacts on drilling fluid characteristics. Consequently, the developing and employing scavengers with optimal performance remains a challenge. The $H_2S$ scavengers can be categorized into two groups: regenerative scavengers, which recycle and go through reversible reactions, such as amine-based compounds, and non-regenerative chemicals that react irreversibly and entirely with $H_2S$. Triazines, aldehydes, oxidizers, and metal-based chemicals are examples of non-regenerative scavengers often used in drilling operations, with metal scavengers being preferred.

Triazines are cost-effective, and can react rapidly with $H_2S$, yet they may lead to undesirable effects, such as the precipitation of dithiazine as a byproduct. Challenges associated with these triazine scavengers include the formation of stubborn solids, a sluggish reaction when directly injected, a tendency to scale, and limited thermal stability. Due to these difficulties, triazines are not the preferred choice for downhole applications unless modified to suit specific wellbore conditions.

Aldehyde-based scavengers are preferrable in acidic conditions. Formaldehyde, acrolein, glyoxal, and glutaraldehyde are some of the most commonly used aldehydes. However, their applications are limited due to their cost, complicated reaction kinetics, and associated health risks. Oxidizers, such as hydrogen peroxide and potassium permanganate, are also employed to eliminate $H_2S$ from drilling fluids. Hydrogen peroxide, though, faces stability issues at high pH levels and acts as a non-selective oxidant, reacting vigorously with other additives in the mud. On the other hand, potassium permanganate exhibits an improved scavenging process with enhanced rheology, but it shows less effective in denser drilling fluids.

Metallic scavengers, including metal oxides, metal salts, and metal chelates, are frequently used, and favorably employed in drilling operations, particularly at elevated temperatures. Metallic scavengers are made of copper, zinc, and iron. The copper compounds show an effective scavenging performance due to their fast reaction kinetics with $H_2S$. However, copper plating on metal surfaces may cause the bimetallic corrosion issue. Nonetheless, copper nitrate exhibits a relatively lower corrosion tendency. Zinc-containing substances, on the other hand, might also effectively scavenge $H_2S$, particularly in nanoparticle form. The features of these compounds, such as availability, amphoteric nature, thermal stability, and predictable reactivity. However, zincate ions could form due to the reaction between the zinc ions and the hydroxyl ions; the formation of zincate ions may result in mud flocculation and rheology degradation. Iron-based scavengers can also be used; however, their performance is pH-dependent. They demonstrate enhanced effectiveness at low pH ranges, although drilling fluids with acidic pH values are uncommon. Furthermore, their reaction with $H_2S$ is complex, influenced by several uncontrollable factors, including surface area, reaction duration, and temperature. Metal chelates have acceptable scavenging ability, high stability, and rapid reactivity at high pH levels. These eco-friendly agents do not impair the drilling fluid properties, yet they are relatively expensive and exhibit reduced effectiveness in heavy drilling fluids.

Each of the aforementioned scavengers suffers from one or more drawbacks hindering their adoption. Hence, there is a need to develop $H_2S$ scavengers to ensure the well-being of personnel, prevent equipment corrosion, and avoid costly consequences.

In view of the foregoing, it is one object of the present disclosure to provide a method for reducing hydrogen sulfide ($H_2S$) content of a $H_2S$-containing subterranean formation. A second objective of the present disclosure is to provide a process for removing hydrogen sulfide ($H_2S$) from a $H_2S$-containing gas composition.

SUMMARY

In an exemplary embodiment, a method for reducing hydrogen sulfide ($H_2S$) content of a $H_2S$-containing subterranean formation is provided. The method includes drilling the $H_2S$-containing subterranean formation to form a wellbore therein. The method includes injecting a drilling fluid composition into the wellbore during the drilling and circulating the drilling fluid composition in the wellbore. The method includes recovering a product stream from the $H_2S$-containing subterranean formation. In some embodiments, the drilling fluid composition includes 0.01 to 0.5 wt. % of manganese tetroxide, based on a total weight of the drilling fluid composition. In some embodiments, the manganese tetroxide is in the form of spherical shaped particles having an average particle size ($D_{50}$) in a range of 0.5 to 2 micrometers (μm). In some embodiments, the manganese tetroxide has a BET surface area of 2 to 3 meter square per gram ($m^2/g$) of the manganese tetroxide.

In some embodiments, the $H_2S$ is present in the $H_2S$-containing subterranean formation at a concentration in a range of 50 to 200 parts per million by volume (ppmv) based on a total volume of the $H_2S$-containing subterranean formation.

In some embodiments, the method has a $H_2S$ breakthrough time of about 840 minutes.

In some embodiments, the drilling fluid composition has a $H_2S$ absorption capacity of about 680 mg $H_2S$ per liter of the drilling fluid composition.

In some embodiments, the product stream recovered from the $H_2S$-containing subterranean formation is substantially free of $H_2S$.

In some embodiments, the wellbore is at least one selected from the group consisting of a vertical well, a deviated well, a horizontal well, and a multilateral well.

In some embodiments, the $H_2S$-containing subterranean formation includes at least one selected from the group consisting of an oil shale formation, a tar sands formation, a coal formation, and a conventional hydrocarbon formation.

In some embodiments, the drilling fluid composition further includes a base fluid, and one or more additives selected from the group consisting of an emulsifier, an anti-foaming agent, a fluid-loss additive, a viscosity modifier, a shale stabilizer, an alkali compound, a bridging agent, and a weighting agent.

In some embodiments, a temperature of the wellbore during the injecting and circulating ranges from 50 to 300° C.

In some embodiments, the drilling fluid composition further includes at least one compound selected from the group consisting of a triazine, copper nitrate, iron sponge, and iron oxide.

In some embodiments, the drilling fluid composition further includes 0.01 to 0.1 wt. % of an anti-foaming agent selected from the group consisting of polydimethylsiloxane, fatty acid ester, silicon dioxide, and vegetable oil. The drilling fluid composition further includes 0.01 to 0.5 wt. % of a viscosity modifier selected from the group consisting of a clay, a saccharide, a polysaccharide, a cellulose, an acrylate polymer and copolymer, and a polyvinyl polymer and copolymer. The drilling fluid composition further includes 0.5 to 5 wt. % of a fluid-loss additive selected from the group consisting of a starch, a starch derivative, a cellulose, and a cellulose derivative. The drilling fluid composition further includes 5 to 15 wt. % of a shale stabilizer selected from the group consisting of a sodium salt, and a sulfonated asphalt. The drilling fluid composition further includes 0.01 to 0.5 wt. % of an alkali compound selected from the group consisting of caustic soda, lime, and soda ash. The drilling fluid composition further includes 1 to 10 wt. % of a bridging agent selected from the group consisting of sodium borate, boric oxide, calcium carbonate, and magnesium oxide. The drilling fluid composition further includes 5 to 15 wt. % of a weighting agent selected from the group consisting of calcium carbonate, barite, and hematite. The drilling fluid composition further includes 60 to 90 wt. % of a base fluid, each wt. % based on a total weight of the drilling fluid composition.

In some embodiments, the drilling fluid composition has a pH of 10 to 12.

In some embodiments, the drilling fluid composition has an apparent viscosity (AV) of about 20.8 centipoise (cP).

In some embodiments, the drilling fluid composition has a plastic viscosity (PV) of about 10 cP.

In some embodiments, the drilling fluid composition has a yield point (YP) of about 17.5 pounds per one hundred square feet (lb/100 $ft^2$).

In some embodiments, the drilling fluid composition has a gel strength value of 5 to 7 lb/100 $ft^2$.

In some embodiments, the wellbore contains a metal. A corrosion rate of the metal is less than $0.9 \times 10^{-5}$ pounds per square feet (lb/$ft^2$), as determined by American Petroleum Institute (API) standard procedures (API 653, and API 571).

In another exemplary embodiment, a process for removing hydrogen sulfide ($H_2S$) from a $H_2S$-containing gas composition is described. The process includes introducing a fluid composition into a column. The fluid composition includes 0.01 to 0.5 wt. % of manganese tetroxide, based on a total weight of the fluid composition. In some embodiments, the manganese tetroxide is in the form of spherical shaped particles having an average particle size ($D_{50}$) in a range of 0.5 to 2 micrometers (μm). In some embodiments, the manganese tetroxide has a BET surface area of 2 to 3 m² per gram of the manganese tetroxide. The process further includes introducing the $H_2S$-containing gas composition to the column containing the fluid composition and passing the $H_2S$-containing gas composition through the fluid composition; and further adsorbing the $H_2S$ from the $H_2S$-containing gas composition onto manganese tetroxide particles of the fluid composition to remove the $H_2S$ from the $H_2S$-containing gas composition and form a purified gas composition.

In some embodiments, the $H_2S$ is present in the $H_2S$-containing gas composition at a concentration in a range of 50 to 200 parts per million by volume (ppmv) based on a total volume of the $H_2S$-containing gas composition.

In some embodiments, the $H_2S$-containing gas composition is introduced to the column at a rate of 1 to 150 milliliters per minute (mL/min) per milligram of the manganese tetroxide particles dispersed in the fluid composition.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
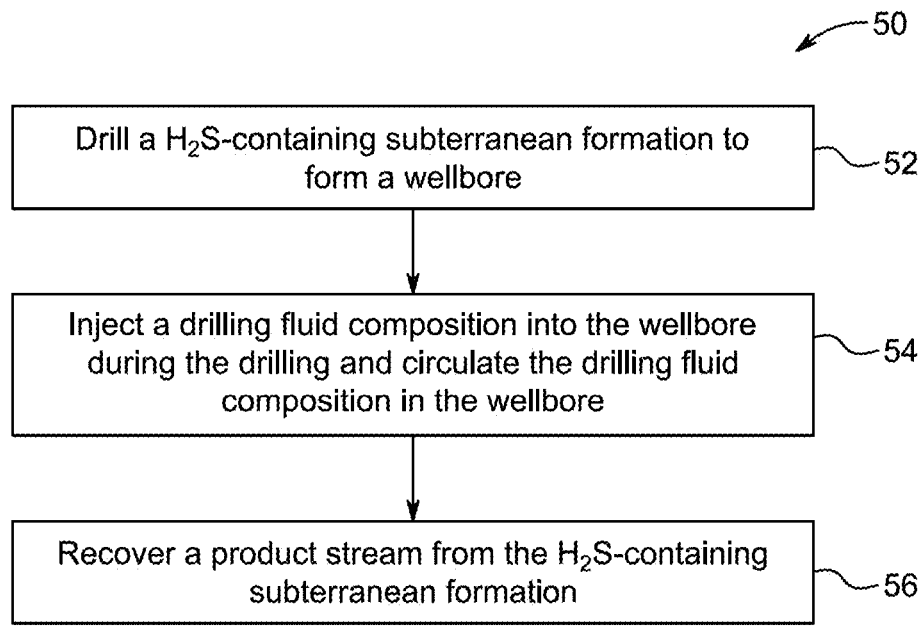
FIG. 1A is a schematic flow chart of a method for reducing hydrogen sulfide ($H_2S$) content in a $H_2S$-containing subterranean formation, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all embodiments of the disclosure are shown.

In the drawings, like reference numerals designate identical or corresponding parts throughout the several views. Further, as used herein, the words "a," "an" and the like generally carry a meaning of "one or more," unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

The use of the terms "include," "includes", "including," "have," "has," or "having" should be generally understood as open-ended and non-limiting unless specifically stated otherwise.

As used herein, the terms "particle size" may be thought of as the lengths or longest dimensions of a particle and a pore opening, respectively.

As used herein, the term "corrosion" generally refers to that material decomposes because chemical reaction occurs with its surrounding environment. There are two main types of corrosion: general or uniform attack corrosion and galvanic corrosion. Typical or uniform corrosion happens, for instance, when the iron is in a humid environment, creating iron oxide and corroding.

As used herein, the term "hydrocarbon" refers to hydrocarbon compounds, i.e., aliphatic compounds (e.g., alkanes, alkenes or alkynes), alicyclic compounds (e.g., cycloalkanes, cycloalkylenes), aromatic compounds, aliphatic and alicyclic substituted. It may refer to aromatic compounds, aromatic substituted aliphatic compounds, aromatic substituted alicyclic compounds and similar compounds. The term "hydrocarbon" may also refer to a substituted hydrocarbon compound, e.g., a hydrocarbon compound containing non-hydrocarbon substituents. Examples of non-hydrocarbon substituents may include hydroxyl, acyl, nitro and the like. The term "hydrocarbon" may as well refer to a hetero-substituted hydrocarbon compound, i.e., a hydrocarbon compound which comprises an atom other than carbon in the chain or ring and the other part comprises a carbon atom. Heteroatoms may include, for example, nitrogen, oxygen, sulfur and similar elements.

Aspects of the present disclosure are directed toward a drilling fluid composition and use thereof as a low-cost $H_2S$ scavenger for effective and safe drilling operations. Drilling fluids are tested to assess rheology, filtering behavior, alkalinity, and corrosion propensity. The experiments are also performed for base drilling fluid without scavengers and for fluids containing commercial scavengers (i.e., triazine and SourScav®), which serve as benchmarking references. The results show that the drilling fluid composition of the present disclosure shows enhanced performance in well $H_2S$ scavenging. Also, the corrosion test shows the noncorrosive characteristic (i.e., the corrosion rate was nearly zero) of the drilling fluid composition of the present disclosure and application in the oil and gas industry.

The crystalline structures of components of the drilling fluid composition of the present disclosure may be characterized by X-ray diffraction (XRD) and X-ray fluorescence spectroscopy (XRF), respectively. The XRD patterns may be collected in a Rigaku MiniFlex diffractometer equipped with a Cu-K$_\alpha$ radiation source ($\lambda$=0.15416 nm) for a 2θ range extending between 5 and 100°, preferably 15 and 80°, further preferably 30 and 60° at an angular rate of 0.005 to 0.04° s$^{-1}$, preferably 0.01 to 0.03° s$^{-1}$, or even preferably 0.02° s$^{-1}$. Other ranges are also possible.

In some embodiments, a H$_2$S scavenger of the drilling fluid composition of the present disclosure contains about 90 to 100 wt. %, preferably 92 to 99 wt. %, preferably 94 to 98 wt. %, or even more preferably 97 wt. %, of hausmannite mineral, each wt. % based on a total weight of the H$_2$S scavenger. In some further embodiments, the hausmannite mineral contains manganese tetroxide having a formula of Mn$_3$O$_4$ (or MnO·Mn$_2$O$_3$). In some embodiments, the Mn$_3$O$_4$ is present in the H$_2$S scavenger in an amount of at least 97 wt. %, preferably at least 98 wt. %, or even more preferably at least 99 wt. %, based on a total weight of the H$_2$S scavenger of the drilling fluid composition of the present disclosure as determined by XRF. Other ranges are also possible.

In some embodiments, the drilling fluid composition includes about 0.01 to 5 wt. %, preferably 0.02 to 4 wt. %, preferably 0.03 to 3 wt. %, preferably 0.04 to 2 wt. %, or even more preferably 0.05 to 1 wt. % of manganese tetroxide, based on a total weight of the drilling fluid composition. In some preferred embodiments, the drilling fluid composition includes about 0.01 to 0.5 wt. %, preferably 0.05 to 0.45 wt. %, preferably 0.1 to 0.4 wt. %, preferably 0.15 to 0.35 wt. %, preferably 0.2 to 0.3 wt. %, or even more preferably about 0.25 wt. % of manganese tetroxide, based on the total weight of the drilling fluid composition. In a preferred embodiment, the drilling fluid composition includes up to about 0.5 wt. % of manganese tetroxide, based on the total weight of the drilling fluid composition. Other ranges are also possible.

In some embodiments, the manganese tetroxide is in the form of spherical-shaped particles having an average particle size (D$_{50}$) of about 0.1 to 6 micrometers (μm), preferably 0.2 to 5 μm, preferably 0.3 to 4 μm, preferably 0.4 to 3 μm, preferably 0.5 to 2 μm, preferably 0.6 to 1 μm, or even more preferably about 1 μm. Other ranges are also possible. In some further embodiments, the manganese tetroxide particles have an average particle size D$_{50}$ less than 0.1 μm, or higher and 5 μm. Other ranges are also possible.

In some embodiments, the manganese tetroxide is in the form of spherical-shaped particles having a 90% cumulative particle size (D$_{90}$) of about 4 to 12 micrometers (μm), preferably 4.5 to 11 μm, preferably 5 to 10 μm, preferably 5.5 to 9 μm, preferably 6 to 8 μm, preferably 6.5 to 7 μm, or even more preferably about 7 μm. Other ranges are also possible. In some further embodiments, the manganese tetroxide particles have an average particle size D$_{90}$ less than 4 μm, or higher and 12 μm. Other ranges are also possible.

In some embodiments, the manganese tetroxide has a BET surface area of 1 to 5 meters square per gram (m$^2$/g) of the manganese tetroxide, preferably 1.5 to 4 m$^2$/g, preferably 2 to 3 m$^2$/g, or even more preferably about 2.5 m$^2$/g. Other ranges are also possible. In some embodiments, the manganese tetroxide is in the form of spherical-shaped particles having an average particle size (D$_{50}$) in a range of 0.5 to 2 μm, more specifically 1.66 μm, and a BET surface area of 2 to 3-meter square per gram (m$^2$/g) of the manganese tetroxide. Other ranges are also possible. As used herein, the term "BET," "BET surface area," "BET specific surface area" or similar terms are computed from Brunauer-Emmett-Teller (BET) analysis of a nitrogen adsorption isotherm. The nitrogen adsorption isotherm measures the available pore volume for the adsorbate (e.g., nitrogen) through the adsorption isotherm and hence compare the pore dimensions derived from adsorption data with those estimated independently when pore filling is not necessary.

In some embodiments, the drilling fluid composition further includes a base fluid, and one or more additives selected from the group consisting of an emulsifier, an anti-foaming agent, a fluid-loss additive, a viscosity modifier, a shale stabilizer, an alkali compound, a bridging agent, and a weighting agent. In some embodiments, a primary emulsifier may be a polyaminated fatty acid that emulsifies water into oil. The primary emulsifier may include a lower hydrophilic-lyophilic balance (HLB) with respect to the secondary emulsifier. In some embodiments, the primary emulsifier may include but is not limited to, span 60, span 85, span 65, span 40, and span 20. In some embodiments, the primary emulsifier is sorbitan oleate, also referred to as the span 80. The drilling fluid composition includes 60 to 90 wt. % of the base fluid, preferably 65 to 85 wt. %, preferably 70 to 80 wt. %, or even more preferably about 75 wt. %, each wt. % is based on the total weight of the drilling fluid composition.

In some embodiments, the base fluid includes an aqueous solvent. In some embodiments, the aqueous solvent may include any water containing solution, including saltwater, hard water, and fresh water. As used herein, the term "seawater" may refer to water present in bays, lakes, rivers, creeks, as well as underground water resources, other than water present in oceans. Salts that may be present in saltwater, hard water, and fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite.

In some embodiments, a secondary emulsifier may include, but is not limited to, triton X-100, Tween 80, Tween 20, Tween 40, Tween 60, Tween 85, OP 4, and OP 7. In some embodiments, the secondary emulsifier includes a biosurfactant such as a rhamnolipid surfactant. Hereinafter, the primary and secondary emulsifiers are collectively referred to as the "emulsifiers" or "surfactants" and individually referred to as the "emulsifier" or "surfactant", unless otherwise specified.

In some embodiments, the surfactants may be a nonionic surfactant, an anionic surfactant, a cationic surfactant, a viscoelastic surfactant, or a zwitterionic surfactant. In some embodiments, the surfactants may include, but is not limited to, ammonium lauryl sulfate, sodium lauryl sulfate (SLS), sodium dodecyl sulfate (SDS), alkyl-ether sulfates sodium laureth sulfate (sodium lauryl ether sulfate (SLES), sodium myreth sulfate, docusate (dioctyl sodium sulfosuccinate), perfluorooctanesulfonate (PFOS), perfluorobutanesulfonate, alkyl-aryl ether phosphates, alkyl ether phosphates, octenidine dihydrochloride; cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB), CHAPS (3-((3-cholamidopropyl)dimethylammonio-1-propanesulfonate), cocamidopropyl hydroxysultaine, ocamidopropyl betaine, phospholipids, and sphingomyelins.

In some embodiments, the drilling fluid composition may include an additional hydrogen sulfide scavenger. In some embodiments, the hydrogen sulfide scavenger may include copper compounds such as copper oxide, copper sulfate, copper molybdate, copper hydroxide, copper halide, copper carbonate, copper hydroxy carbonate, copper carboxylate, copper phosphate, copper hydrates and copper derivatives thereof; calcium salts, cobalt salts, nickel salts, lead salts, tin salts, zinc salts, iron salts, manganese salts, zinc oxide, iron oxides, manganese oxides, triazine, monoethanolamine, diethanolamine, caustic soda, and combinations thereof. In some embodiments, the hydrogen sulfide scavenger may be potassium permanganate. The concentration of the additional hydrogen sulfide scavenger may be adjusted according to the amount of hydrogen sulfide that may be encountered during a wellbore drilling.

In some embodiments, the drilling fluid composition includes a viscosifier. The viscosifier is an additive of the drilling fluid composition that increases the viscosity of the drilling fluid composition. In some embodiments, the viscosifier may include, but is not limited to sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier may further include one or more thickening agents such as XC-polymer, xanthan gum, guar gum, glycol, and combinations thereof. In some embodiments, the viscosifier is bentonite. The "bentonite" may refer to potassium bentonite, sodium bentonite, calcium bentonite, aluminum bentonite, and combinations thereof, depending on the relative amounts of potassium, sodium, calcium, and aluminum in the bentonite. In some embodiments, the viscosifier is a corn starch. The drilling fluid composition includes 0.01 to 0.5 wt. % of the viscosity modifier selected from the group consisting of a clay, a saccharide, a polysaccharide, a cellulose, an acrylate polymer and copolymer, and a polyvinyl polymer and copolymer.

The drilling fluid composition preferably includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, and about 0.4 wt. % of the fluid-loss additive or fluid loss prevention agent. The drilling fluid composition includes up to about 5 wt. % of the fluid-loss additive or fluid loss prevention agent. The drilling fluid composition includes 0.5 to 5 wt. % of the fluid-loss additive or fluid loss prevention agent selected from the group consisting of a starch, a starch derivative, a cellulose, and a cellulose derivative. The fluid loss prevention agent is an additive of the drilling fluid composition that controls loss of the drilling fluid composition when injected into the subterranean formation. In some embodiments, the drilling fluid composition may include multiple fluid loss prevention agents depending on the customized need of a user. In some embodiments, the fluid loss prevention agent may include, but is not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the fluid loss prevention agent is at least one selected from the group consisting of the corn starch and poly(vinyl butyral)-co-vinyl alcohol-co-vinyl acetate (PVBA).

In some embodiments, the drilling fluid composition includes a pH adjusting agent, also referred to as the buffer. In some embodiments, the pH adjusting agent is an additive of the drilling fluid composition that adjusts the pH of the drilling fluid composition. The pH adjusting agent includes an alkali metal base. In some embodiments, the alkali metal base is sodium hydroxide. In some embodiments, the alkali metal base may include, but is not limited to, potassium hydroxide, lithium hydroxide, rubidium hydroxide and cesium hydroxide. In some embodiments, the pH adjusting agent may include, but is not limited to, monosodium phosphate, disodium phosphate, sodium tripolyphosphate. In some embodiments, the pH of the drilling fluid composition is acidic or neutral. In some embodiments, the pH of the drilling fluid composition is basic. In some embodiments, the drilling fluid composition has a pH up to about 10, and about 11. Other ranges are also possible. In some embodiments, the drilling fluid composition has a pH up to about 12. In some embodiments, the drilling fluid composition has a pH of 10 to 12. Other ranges are also possible.

The drilling fluid composition preferably further includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. %, about 0.1 wt. %, about 0.2 wt. %, about 0.3 wt. %, and about 0.4 wt. % of the alkali compound or alkali metal halide salt. The drilling fluid composition further includes up to about 0.5 wt. % of the alkali compound or alkali metal halide salt. The drilling fluid composition further includes 0.01 to 0.5 wt. % of the alkali compound or alkali metal halide salt selected from the group consisting of caustic soda, lime, and soda ash. A clay stabilizer is an additive of the drilling fluid composition that aids in the stabilization of shales and to control swelling clays. In some embodiments, the alkali metal halide salt is potassium chloride. In some embodiments, the alkali metal halide salt may include, but is not limited to, sodium chloride, lithium chloride, rubidium chloride, and cesium chloride. In some embodiments, the clay stabilizer may include an alkaline earth metal halide salt. In some embodiments, the alkaline earth metal halide salt may include, but is not limited to, calcium chloride, and magnesium chloride.

The drilling fluid composition preferably includes a filtration rate agent that is an additive for aqueous drilling fluid compositions to reduce the loss of fluids from a mud cake to pores of the formation during drilling of oil and gas wells. In some embodiments, the filtration rate agent is sodium carbonate.

The drilling fluid composition preferably includes about 5 wt. %, about 6 wt. %, about 7 wt. %, about 8 wt. %, about 9 wt. %, about 10 wt. %, and about 11 wt. %, about 12 wt. %, about 13 wt. %, and about 14 wt. % of the weighting agent. The drilling fluid composition includes up to about 15 wt. % of the weighting agent. The drilling fluid composition includes 5 to 15 wt. % of the weighting agent selected from the group consisting of calcium carbonate, barite, and hematite. The weighting agent is an agent that increases the overall density of the drilling fluid composition to provide sufficient bottom-hole pressure to prevent an unwanted influx of formation fluids. In some embodiments, the weighting agent may include, but is not limited to, calcium carbonate, barite, sodium sulfate, hematite, siderite, and ilmenite. In some embodiments, the weighting agent is hydrophobic metallic zinc nanoparticles.

In some embodiments, the drilling fluid composition may also include a deflocculant. Deflocculant is an additive of the drilling fluid composition that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the drilling fluid composition may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC).

In some embodiments, the drilling fluid composition may also include a crosslinker. The crosslinker is an additive of the drilling fluid composition that can react with multiple-strand polymers to couple molecules together, thereby creating a highly viscous fluid, with a controllable viscosity. The crosslinker may include, but is not limited to, metallic salts, such as salts of Al, Fe, B, Ti, Cr, and Zr, or organic crosslinkers such as polyethylene amides and formaldehyde.

In some embodiments, the drilling fluid composition may also a breaker. The breaker is an additive of the drilling fluid composition that provides a desired viscosity reduction in a specified period. The breaker may include, but is not limited to, oxidizing agents, such as sodium chlorites, sodium bromate, hypochlorites, perborate, persulfates, peroxides, and enzymes.

In some embodiments, the drilling fluid composition includes a biocide. The biocide is an additive of the drilling fluid composition that may kill microorganisms present in the drilling fluid composition. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

The drilling fluid composition may also include a corrosion inhibiting agent. The corrosion inhibiting agent is a chemical compound that decreases the corrosion rate of a material, more preferably, a metal or an alloy, which meets the drilling fluid composition. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group IIIa to VIa such as $SbBr_3$.

The drilling fluid composition may also include an anti-scaling agent. The anti-scaling agent is an additive of the drilling fluid composition that inhibit the formation and precipitation of crystallized mineral salts that form scale. The anti-scaling agent may include, but is not limited to, phosphonates, acrylic co/ter-polymers, polyacrylic acid (PAA), phosphene poly carboxylic acid (PPCA), phosphate esters, hexamethylene diamine tetrakis(methylene phosphonic acid), diethylene triamine tetra(methylene phosphonic acid), diethylene triamine penta(methylene phosphonic acid) (DETA phosphonate), bis-hexamethylene triamine pentakis(methylene phosphonic acid) (BHMT phosphonate), 1-hydroxyethylidene 1,1-diphosphonate (HEDP phosphonate), and polymers of sulfonic acid on a polycarboxylic acid backbone.

In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid composition may include metal sulfide scale removal agents such as hydrochloric acid. The drilling fluid composition includes about 5 wt. %, about 6 wt. %, about 7 wt. %, about 8 wt. %, about 9 wt. %, about 10 wt. %, and about 11 wt. %, about 12 wt. %, about 13 wt. %, and about 14 wt. % of the shale stabilizer. The drilling fluid composition includes up to about 15 wt. % of the shale stabilizer. The drilling fluid composition includes 5 to 15 wt. % of the shale stabilizer selected from the group consisting of a sodium salt, and a sulfonated asphalt. Other ranges are also possible.

The drilling fluid composition may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA). Concentration of components of the drilling fluid composition may be varied to impart desired characteristics of the drilling fluid composition.

In some embodiments, the drilling fluid composition further includes at least one compound selected from the group consisting of a triazine, copper nitrate, iron sponge, and iron oxide. In some embodiments, the drilling fluid composition further includes about 0.01 wt. %, about 0.02 wt. %, about 0.03 wt. %, about 0.04 wt. %, about 0.05 wt. %, about 0.06 wt. %, about 0.07 wt. %, about 0.08 wt. %, about 0.09 wt. % of an anti-foaming agent. In some embodiments, the drilling fluid composition further includes up to about 0.1 wt. % of the anti-foaming agent. Other ranges are also possible.

In some embodiments, the drilling fluid composition further includes 0.01 to 0.1 wt. % of the anti-foaming agent selected from the group consisting of polydimethylsiloxane, fatty acid ester, silicon dioxide, and vegetable oil. The drilling fluid composition further includes about 1 wt. %, about 2 wt. %, about 3 wt. %, about 4 wt. %, about 5 wt. %, about 6 wt. %, about 7 wt. %, about 8 wt. %, about 9 wt. % of a bridging agent. The drilling fluid composition further includes up to about 10 wt. % of the bridging agent. The drilling fluid composition further includes 1 to 10 wt. % of the bridging agent selected from the group consisting of sodium borate, boric oxide, calcium carbonate, and magnesium oxide. Other ranges are also possible.

In some embodiments, the drilling fluid composition has an apparent viscosity (AV) of about 10 to 50 centipoise (cP), preferably 15 to 40 cP, preferably 20 to 30 cP. In some preferred embodiments, the drilling fluid composition has an AV of about 20.8 cP. Other ranges are also possible. As used herein, the term "apparent viscosity (AV)" refers to the ratio between shear stress and shear rate over a narrow range for a plastic melt.

In some embodiments, the drilling fluid composition has a plastic viscosity (PV) of 5 to 30 cP, preferably 6 to 25 cP, preferably 6 to 20 cP, preferably 7 to 15 cP, or even more preferably 8 to 10 cP. Other ranges are also possible. In some preferred embodiments, the drilling fluid composition has a plastic viscosity (PV) of about 10 cP. As used herein, the term "plastic viscosity (PV)" refers to the resistance offered by a fluid to flow freely. This resistance is a result of friction between the liquid undergoing deformation under shear stress and the solids and liquids present in the drilling mud.

In some embodiments, the drilling fluid composition has a yield point (YP) of 5 to 40 pounds per one hundred square feet (lb/100 ft$^2$), preferably 8 to 35 lb/100 ft$^2$, preferably 11 to 30 lb/100 ft$^2$, preferably 14 to 25 lb/100 ft$^2$, or even more preferably 17 to 20 lb/100 ft$^2$. Other ranges are also possible. In some preferred embodiments, the drilling fluid composition has a yield point of about 17.5 lb/100 ft$^2$. As used herein, the term "yield point" refers to the stress beyond which a material deforms by a relatively large amount for a small increase in the stretching force.

In some embodiments, the drilling fluid composition has a gel strength value of about 1 to 20 lb/100 ft$^2$, preferably 2 to 15 lb/100 ft$^2$, preferably 3 to 10 lb/100 ft$^2$, preferably 4 to 8 lb/100 ft$^2$, or even more preferably 5 to 7 lb/100 ft$^2$. Other ranges are also possible. In some preferred embodiments, the drilling fluid composition has the gel strength value of 5 to 7 lb/100 ft$^2$. Other ranges are also possible. As used herein, the term "gel strength" refers to the tendency of the drilling fluid to resist deformation under the applied stress and the ability of the drilling fluid to develop and maintain a gel-like structure under static conditions.

In some embodiments, the drilling fluid composition has a $H_2S$ absorption capacity of about 300 to 1000 mg, preferably 400 to 900 mg, preferably 500 to 800 mg, preferably 600 to 700 mg, or even more preferably about 680 mg $H_2S$ per liter of the drilling fluid composition. Other ranges are also possible.

Referring to FIG. 1A, a flow chart of a method 50 for reducing hydrogen sulfide ($H_2S$) content of the $H_2S$-containing subterranean formation, is illustrated. Generally, the $H_2S$-containing subterranean formation is at least one selected from the group consisting of an oil shale formation, a tar sands formation, a coal formation, and a conventional hydrocarbon formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes drilling the $H_2S$-containing subterranean formation to form a wellbore therein. In some embodiments, a drill bit may be driven. In some embodiments, the drill bit may include, but is not limited to, a twist drill, counterbore, countersink, and flat bottom boring. The method 50 includes driving the drill bit to form the wellbore in the subterranean formation. In some embodiments, the wellbore is drilled with the drill bit coupled to a motor. In the present disclosure, the wellbore is a portion of an oil well or a gas well, i.e., a borehole, that faces a formation matrix of the subterranean formation. In some embodiments, the wellbore contains a metal. The corrosion rate of the metal is less than $5\times10^{-5}$ pounds per square feet (lb/ft$^2$), preferably less than $4\times10^{-5}$ lb/ft$^2$, preferably less than $3\times10^{-5}$ lb/ft$^2$, preferably less than $2\times10^{-5}$ lb/ft$^2$, preferably less than $1\times10^{-5}$ lb/ft$^2$, or even more preferably less than $0.9\times10^{-5}$ lb/ft$^2$, as determined by American Petroleum Institute (API) standard procedures (API 653: Aboveground Storage Tank Inspector; and API 571: Corrosion and Materials, each of which is incorporated herein by reference in their entireties). In some embodiments, the wellbore includes casing that is made up of one or more metals selected from stainless steel, aluminum, fiberglass, and titanium.

In some embodiments, the wellbore is at least one selected from the group consisting of a vertical well, a deviated well, a horizontal well, and a multilateral well. In some embodiments, the wellbore may be a horizontal wellbore or a multilateral wellbore. The horizontal wellbore may include one or more sections located parallel to a ground surface. The method 50 further includes driving the drill bit to form the wellbore into the subterranean formation thereby producing a formation fluid. The composition of the formation fluid that may be produced during the drilling may depend on the type of the subterranean formation.

In some embodiments, the formation fluid may be a sour gas or sour crude oil. In some embodiments, the formation fluid is at least one selected from the group consisting of a natural gas and a crude oil. In some embodiments, the formation fluid may include, but is not limited to, natural gas (i.e., primarily methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water. Further, non-condensable gases such as hydrogen, carbon monoxide, carbon dioxide, and methane may also be present in the formation fluid. In some other embodiments, the formation fluid may be a gaseous fluid, a liquid, or a double-phase fluid. In some embodiments, the formation fluid includes hydrogen sulfide. In gas and oil reservoirs, microorganisms such as sulfate-reducing bacteria may generate hydrogen sulfide.

At step 54, the method 50 includes injecting a drilling fluid composition into the wellbore during the drilling and circulating the drilling fluid composition in the wellbore. In some embodiments, the drilling fluid is injected into the subterranean formation through the wellbore to maintain a temperature and pressure in the wellbore that is higher than the static pressure of the subterranean formation. In some embodiments, the temperature of the wellbore during the injection and circulation is about 50° C., about 100° C., about 150° C., about 200° C., and about 250° C. In some embodiments, the temperature of the wellbore during the injection and circulation is up to about 300° C. In some embodiments, the temperature of the wellbore during the injecting and circulating ranges from 50 to 300° C. Other ranges are also possible.

At step 56, the method 50 includes recovering a product stream from the $H_2S$-containing subterranean formation. The product stream recovered from the $H_2S$-containing subterranean formation is substantially free of $H_2S$. As used herein, "substantially free" refers to the absence of at least 80%, preferably 81%, 82%, 83%, 84%, 85%, 86%, 87%, 88%, 89%, 90%, 91%, 92%, 93%, 94%, 95%, 96%, 97%, 98%, about 99%, preferably >99% of $H_2S$ in the $H_2S$-containing subterranean formation. In some embodiments, the method 50 has a $H_2S$ breakthrough time of about 840 minutes.

As used herein, the term "breakthrough time" refers to the elapsed time between initial contact of the drilling fluid composition with the $H_2S$-containing subterranean formation and the time at which $H_2S$ is detected in the product stream. In accordance with the present disclosure, the detection limit for $H_2S$ in a gas composition is 0.5 ppm, or even more preferably about 0.1 ppm, based on a total weight of the gas composition.

The drilling fluid of the present disclosure performs exceptionally well for $H_2S$ scavenging because it increases the aqueous drilling fluid's scavenging capacity from 84 to 680 milligrams (mg) $H_2S$/L of fluid, showing a 500 to 1000%, or even more preferably about 700% improvement. This $H_2S$ scavenging performance is about 4 and 5 times higher than those of triazine and SourScav (commercial scavengers), respectively. The components (e.g., the $H_2S$ scavenger) of the drilling fluid of the present disclosure and commercial scavengers do not impair the drilling fluid rheology and have no notable influence on the rheological parameters. The drilling fluid of the present disclosure decreased the fluid loss of the base fluid from 8 to 2 cubic centimeters ($cm^3$), preferably from 7 to 3 $cm^3$, preferably from 6 to 4 $cm^3$, or even more preferably from 4.7 to 4.2 $cm^3$ but unfavorably raise the formed filter cake thickness from 1 to 8 millimeters (mm), preferably from 1.5 to 7 mm, preferably 2 to 6 mm, preferably from 2.5 to 5 mm, or even more preferably from 2.9 to 4.8 millimeters (mm), which was also increased with triazine and SourScav to 3 to 5 mm, or even more preferably 3.5 and 3.9 mm, respectively. Other ranges are also possible. The pH should be kept above a value of 9 to 11.5, or preferably about 10 while drilling in a sour environment, which is achieved by utilizing the drilling fluid of the present disclosure and triazine since the pH values of drilling fluids containing these scavengers are maintained at 11.2 and 11.1, respectively, unlike SourScav which reduce the pH to a critical value of about 7.9.

As used herein, the term "scavenging capacity," "adsorption capacity", and similar terms generally refer to the amount of adsorbate taken up by the adsorbent per unit mass or per unit volume of the adsorbent. In accordance with the present disclosure, the term refers to the amount of $H_2S$ taken up by the drilling fluid compostion.

Figure 1B:
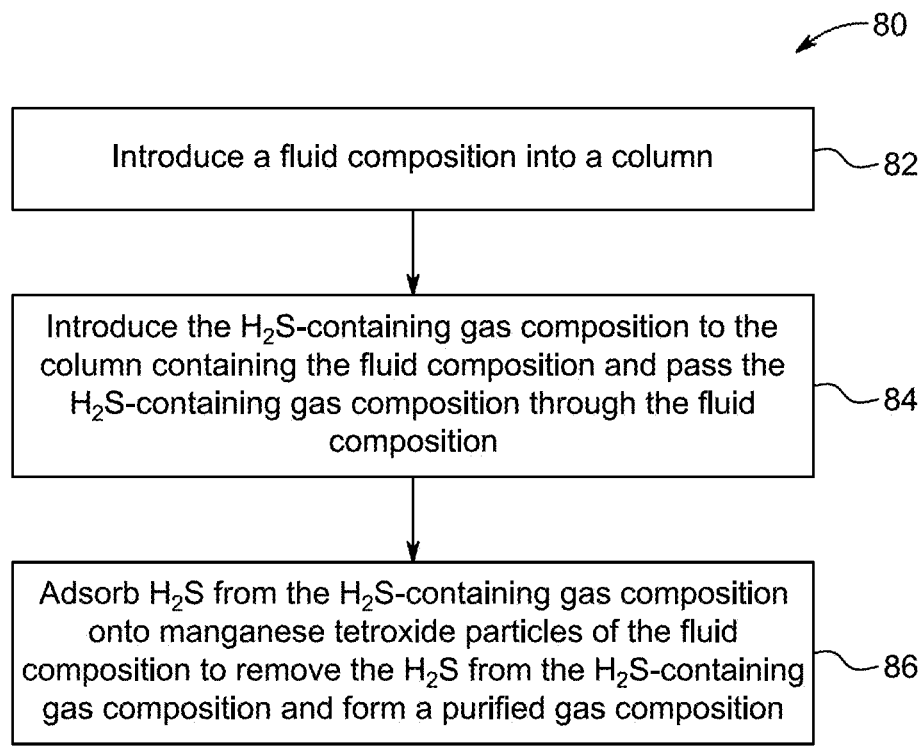
FIG. 1B is a schematic flow chart of a process for removing hydrogen sulfide ($H_2S$) from a $H_2S$-containing gas composition, according to certain embodiments.

FIG. 1B depicts a method 80 for removing hydrogen sulfide ($H_2S$) from a $H_2S$-containing gas composition. In some embodiments, the concentration of $H_2S$ in the $H_2S$-containing gas composition at a concentration in a range of 50 to 200 ppmv based on the total volume of the $H_2S$-containing gas composition, preferably 70 to 180 ppmv, preferably 90 to 160 ppmv, preferably 110 to 140 ppmv, or even more preferably 120 to 130 ppmv. Other ranges are also possible. The order in which method 80 is described is not intended to be construed as a limitation, and any number of the described method steps can be combined in any order to implement method 80. Additionally, individual steps may be removed or skipped from the method 80 without departing from the spirit and scope of the present disclosure.

At step 82, the method 80 includes introducing a fluid composition into a column. The fluid composition includes 0.01 to 0.5 wt. % of manganese tetroxide, based on the total weight of the fluid composition, preferably 0.05 to 0.4 wt. %, preferably 0.1 to 0.3 wt. %, or even more preferably about 0.2 wt. %, based on the total weight of the fluid composition. Other ranges are also possible. The manganese tetroxide is in the form of spherical-shaped particles having an average particle size ($D_{50}$) in a range of 0.5 to 2 micrometers (μm), preferably 0.7 to 1.8 μm, preferably 0.9 to 1.6 μm, preferably 1.1 to 1.4 μm, or even more preferably 1.2 to 1.3 μm. Other ranges are also possible. In some embodiments, the manganese tetroxide has a BET surface area of 2 to 3 $m^2$ per gram of manganese tetroxide, or even more preferably about 2.5 $m^2$ per gram of manganese tetroxide. Other ranges are also possible.

In some embodiments, the column may be in the form of a reactor. In a further exemplary embodiment, the reactor is at least one reactor selected from the group consisting of a stirred tank reactor, a packed bed reactor, a slurry reactor, and a bubble column reactor. In some embodiments, the reactor is a stirred tank reactor. In some embodiments, the reactor may not require stirring or agitation at all, or may be carried out with shearing or agitation no more than 20000, 10000, 5000, 2500, 1000, 500, 400, 300, 200, 100, 50, 25, or 10 Hz, and no less than 5, 10, 25, 50, 100, 200, 300, 400, 500, 1000, 2500, 5000, 10000, or 15000 Hz at a temperature in a range of 5 to 50° C., 10 to 45° C., preferably 15 to 40° C., further preferably 20 to 35° C., and more preferably 25 to 30° C. In some embodiments, the liquid occupies at least $\frac{1}{20}$, $\frac{1}{10}$, $\frac{3}{10}$, $\frac{1}{2}$, $\frac{2}{3}$, $\frac{4}{5}$, or $\frac{9}{10}$ of the reactor volume. In some embodiments, the liquid occupies no more than $\frac{10}{11}$, $\frac{9}{10}$, $\frac{4}{5}$, $\frac{2}{3}$, $\frac{1}{2}$, $\frac{3}{10}$, or $\frac{1}{10}$ of the reactor volume. In some embodiments, means of stirring or agitation may include magnetic stirring via magnetic spin bar, impellers, and/or ultrasonic waves. In certain embodiments, stirring or agitation may speed up the removal of $H_2S$.

As used herein, the term "stirred tank reactor," "continuous stirred tank reactor," "mixed flow reactor," "continuous flow stirred tank reactor," and similar terms generally refer to a model for a chemical reactor in chemical engineering. The stirred tank reactor may have a liquid height and a rotating shaft containing a plurality of agitator blades.

At step 84, the process 80 includes introducing the $H_2S$-containing gas composition to the column containing the fluid composition and passing the $H_2S$-containing gas composition through the fluid composition. In some embodiments, the $H_2S$-containing gas composition is introduced to the column at a rate of 1 to 150 milliliters per minute (mL/min) per milligram of the manganese tetroxide particles dispersed in the fluid composition, preferably 10 to 140, preferably 20 to 130, preferably 30 to 120, preferably 40 to 110, preferably 50 to 100, preferably 60 to 90, or even more preferably 70 to 80 mL/min per milligram of the manganese tetroxide particles dispersed in the fluid composition. Other ranges are also possible.

At step 86, the process 80 includes adsorbing the $H_2S$ from the $H_2S$-containing gas composition onto manganese tetroxide particles of the fluid composition to remove the $H_2S$ from the $H_2S$-containing gas composition and form a purified gas composition. The fluid composition of the present disclosure removes at least 50%, 55%, 60%, 65%, 70%, 75%, 80%, 85%, 90%, 91%, 92%, 93%, 94%, 95%, 96%, 97%, 98%, 99%, and >99% of $H_2S$ from the $H_2S$-containing gas composition. Other ranges are also possible.

EXAMPLES

The following examples describe and demonstrate exemplary embodiments of the method for reducing hydrogen sulfide ($H_2S$) content of a $H_2S$-containing subterranean formation described herein. The examples are provided solely for the purpose of illustration. They are not to be construed as limitations of the present disclosure, as many variations thereof are possible without departing from the spirit and scope of the present disclosure.

Example 1: Materials and Methods

The base drilling fluid sample used in the present disclosure was prepared according to a practical field formulation, which involved sequentially mixing multiple additives in distilled water with a high-speed mixer under ambient circumstances. First, the anti-foaming agent named defoamer was added to water, followed by the Xanthan viscosifier polymer, starch that serves primarily to control fluid losses and promote viscosity buildup, sodium chloride as a clay stabilizer, caustic soda to control the alkalinity, and then calcium carbonate was used as bridging material and densifier. Lastly, the commercial/proposed $H_2S$ scavengers were mixed into the base drilling fluid. Table 1 presents the order and dosage of each additive in the drilling fluid formulation. The density of the prepared drilling fluid samples was 9.8 ppg.

Two commercial H$_2$S scavengers (i.e., Triazine and SourScav®) were utilized for comparison as benchmark points. Triazine is a liquid having a concentration of 60 vol. %, a pH of 10.5, and a specific gravity of 1.07. SourScav® is a water-soluble iron gluconate-base powder having a pH of 4.5 and a specific gravity of 0.70. The scavenger of the present disclosure (i.e., "Micromax") may be in the form of a water-insoluble brown-blackish powder with a specific gravity of, e.g., preferably about 4.88, and an average particle size of, e.g., preferably about 1.66 µm. According to the X-ray diffraction (XRD) and X-ray fluorescence spectroscopy (XRF) analyses, the water-insoluble brown-blackish powder has a high purity containing 97% hausmannite mineral with more than 99% of the manganese element content.

TABLE 1

The composition of the drilling fluid of the present disclosure.

| Component | Amount |
|---|---|
| Distilled water | 316 cm$^3$ |
| Defoamer | 0.08 cm$^3$ |
| Xanthan gum | 1 g |
| Starch | 6 g |
| NaCl | 34 g |
| Caustic soda | 0.25 g |
| CaCO$_3$ (25 µm + 50 µm) | 24 + 36 g |
| H$_2$S scavenger | 0/1 g |

Figure 1C:
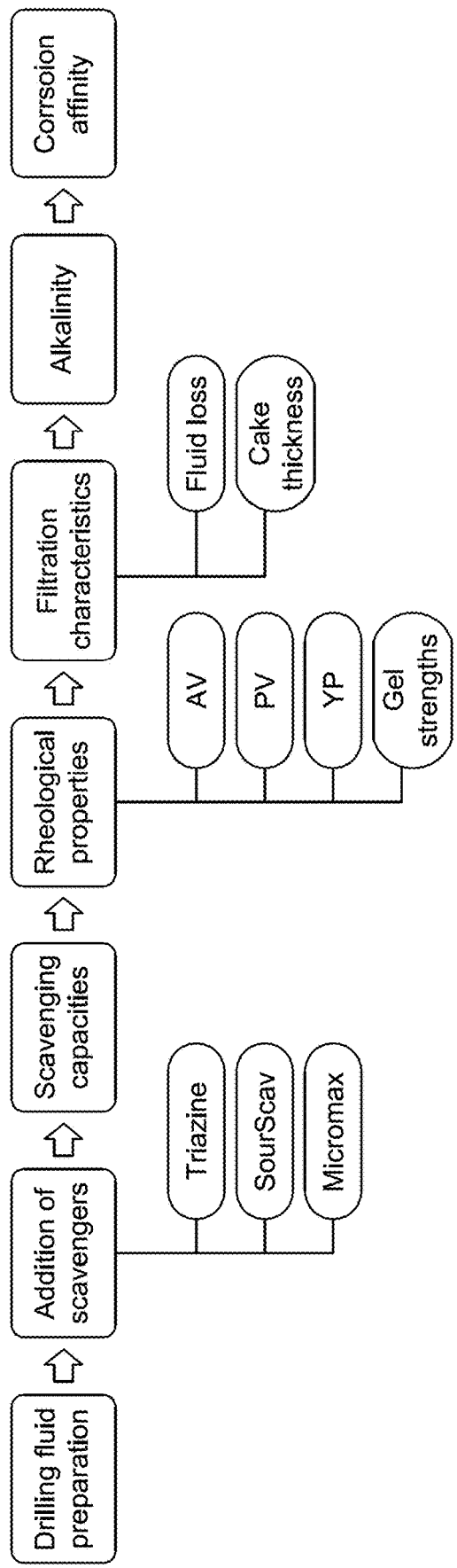
FIG. 1C depicts a methodology diagram exploring the potential of a drilling fluid composition of the present disclosure as an $H_2S$ scavenger in comparison to base and reference fluids.

The scavenging capacity of the water-insoluble brown-blackish powder as an H$_2$S scavenger, alone and as a composition with other components, was examined, and its influence on the properties of the aqueous drilling fluid was compared with the base and reference fluids. FIG. 1C provides a summary of the results of the present disclosure. At room temperature, the scavenging test was performed by exposing 10 cm$^3$ of fluid sample in a burette to H$_2$S gas from a cylinder containing 100 ppm H$_2$S. A flowmeter with a control valve was used at the gas inlet to regulate the flow rate at 150 cubic centimeters per minute (cm$^3$/min), while a MultiRAE gas detector was linked to the burette outlet to continually measure the released H$_2$S concentration until saturation was attained (i.e., 100 ppm).

Using the equation below and the recorded concentrations (Ahmed, A., Onaizi, S. A., Elkatatny, S., 2022d. Improvement of Hydrogen Sulfide Scavenging via the Addition of Monoethanolamine to Water-Based Drilling Fluids. ACS Omega 7, 28361-28368, which is incorporated herein by reference in its entirety), the H$_2$S scavenging capacities at saturation time were quantified for the base fluid and fluids containing triazine, SourScav, and the drilling fluid of the present disclosure.

$$\text{Saturation capacity (mg/}l\text{)} = 150 \times 10^{-7} \times \rho \times \int_0^{t_s} (100 - C_{out}) dt \quad (1)$$

where ρ is the H$_2$S density equal to 1.391 milligrams per cubic centimeters (mg/cm$^3$), t$_s$ is the saturation time when H$_2$S concentration in the burette outlet reached 100 ppm, and Cout is the outlet H$_2$S concentration.

The rheological characteristics of the base and the scavenger-comprising drilling fluids were studied at 120° F. The Bingham plastic model was used to calculate the apparent viscosity (AV), plastic viscosity (PV), and yield point (YP), whereas the gel strengths (10 seconds and 10 minutes) were determined from the dial reading at 3 rotations per minute (RPM) after the static duration.

A fluid loss test was performed following the API-recommended practices to assess the filtration properties of the prepared drilling fluids. The static test was conducted using the high-pressure high-temperature (HPHT) filter press at 250° F. for 30 minutes with a differential pressure of 300 psi. A 40 µm ceramic disc was employed as filtering media. The filtrate was collected in a cylinder for 30 minutes; the filtrate volume was recorded at various intervals, and the filter cake's thickness was measured.

The pH of the drilling fluid is a crucial parameter in a sour environment and substantially impacts the rheology and filtration performance (Gamal, H., Elkatatny, S., Basfar, S., Al-Majed, A., 2019. Effect of pH on Rheological and Filtration Properties of Water-Based Drilling Fluid Based on Bentonite. Sustainability 11, 6714, which is incorporated herein by reference in its entirety). So, the alkalinity of all drilling fluid samples was investigated by measuring the pH values at room temperature with a calibrated digital pH meter. The corrosion rate for the drilling fluid of the present disclosure was assessed and compared with the rates for the base and benchmark fluids. The HPHT corrosive test was carried out at 300 psi and 250° F. by submerging a metal coupon made of N80 grade casing steel in the fluid sample within an autoclave cell for 6 hours.

Example 2: H$_2$S Scavenging Performance

Figure 2:
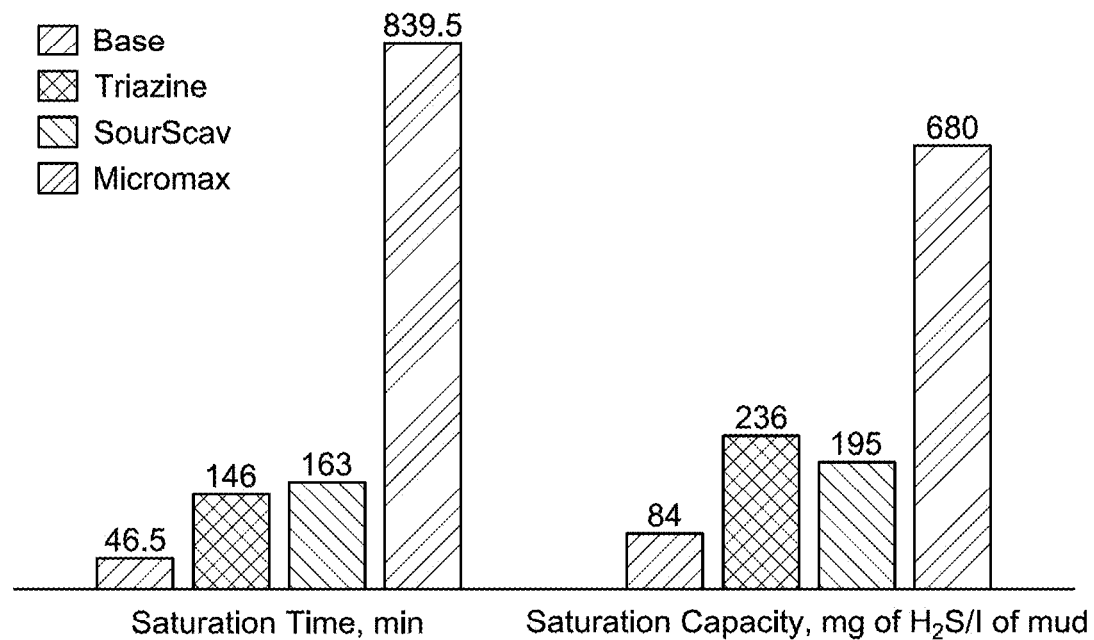
FIG. 2 shows $H_2S$ scavenging capacities and saturation times for various drilling fluids such as base, triazine, SourScav, and an embodiment of the present disclosure, according to certain embodiments.

The ability of the designed drilling fluids to scavenge H$_2$S was evaluated by flowing 100 ppm H$_2$S into each fluid sample. The saturation capacity was then obtained from Equation 1 at the moment of the saturation, which occurred once the H$_2$S concentration in the exit gas stream reached 100 ppm (equivalent to the input gas concentration). FIG. 2 displays each fluid sample's measured saturation time and corresponding scavenging capacity.

After 46.5 minutes of interaction with the base fluid, the H$_2$S concentration was brought to saturation, but the addition of triazine and SourScav delayed reaching the saturation until 146 and 163 minutes, respectively. The drilling fluid of the present disclosure continued to scavenge H$_2$S for 839.5 minutes. The results indicated that the H$_2$S scavenging capacity for the base fluid was 84 mg of H$_2$S/L of fluid, while triazine and SourScav increased the amounts of H$_2$S scavenged at the saturation capacity by 179 and 131%, respectively, reaching 236 and 195 mg/L. However, the drilling fluid of the present disclosure had substantially improved scavenging capacity to 680 mg/L, corresponding to about 707% improvement relative to the base fluid in the absence of the water-insoluble brown-blackish powder mentioned above.

The following stoichiometric equation describes how the drilling fluid of the present disclosure reacts with H$_2$S:

$$Mn_3O_4 + 4H_2S \rightarrow 2MnS + MnS_2 + 4H_2O \quad (1)$$

This reaction indicates that 1 mole of the active water-insoluble brown-blackish powder of the drilling fluid of the present disclosure reacts with 4 moles of H$_2$S to produce 2 moles of MnS, 1 mole of MnS$_2$, and 4 moles of H$_2$O. Given that the active water-insoluble brown-blackish powder, MnS, MnS$_2$, and H$_2$S have molecular weights of 228.8, 87.0, 119.1, and 34.1 g/mol, respectively, each gram of the active water-insoluble brown-blackish powder consumes around 596 mg of $H_2S$, which explains its high $H_2S$ scavenging capacity. Adding this value to the base mud gives an overall scavenging capacity of 680 mg, which is the exact amount of $H_2S$ scavenged using the drilling fluid of the present disclosure. Accordingly, the active component of the drilling fluid of the present disclosure is fully utilized in the $H_2S$ scavenging process, demonstrating its excellent performance.

Example 3: Rheological Characteristics

Figure 3:
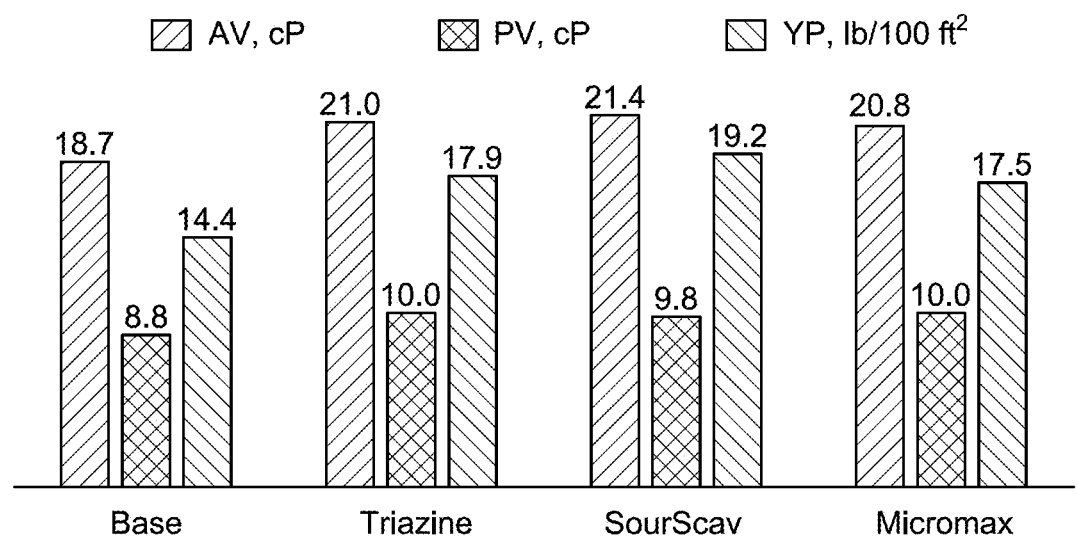
FIG. 3 is a graph depicting apparent viscosity (AV), plastic viscosity (PV), and yield point (YP) values for various drilling fluids, according to certain embodiments.

According to the rheology experiments, the AV, PV, and YP values of the base drilling fluid were 18.7 cP, 8.8 cP, and 14.4 lb/100 ft². As shown in FIG. 3, the drilling fluids containing triazine, SourScav, and the drilling fluid of the present disclosure exhibited higher AV values near each other in the range of 20.8 to 21.4 cP. The PV increased to 9.8 cP for SourScav and 10.0 cP for triazine and drilling fluid of the present disclosure. The YP values were boosted to 17.5 and 17.9 lb/100 ft² with drilling fluid of the present disclosureand triazine, respectively, and reached 19.2 lb/100 ft² with SourScav.

The drilling fluids should possess low PV and a high YP for effective operations. Low PV (recommended to be less than 25 cP) provides more fluid flowability with a lower pressure loss, which minimizes the required pumping pressure. On the other hand, high YP value, but not surpassing 50 lb/100 ft², shows higher carrying capacity during drilling fluid circulation. For optimal fluid loss performance, the AV should be higher than 15 cP and ideally between 20 and 35 cP (Fink, J. K., 2003. Fluid Loss Additives, in: Oil Field Chemicals. Elsevier, pp. 34-57; and Perween, S., Thakur, N. K., Beg, M., Sharma, S., Ranjan, A., 2019. Enhancing the properties of water based drilling fluid using bismuth ferrite nanoparticles. Colloids Surf A Physicochem Eng Asp 561, 165-177, each of which in incorporated herein by reference in their entireties). The YP/PV ratio is another tool for evaluating the effectiveness of hole cleaning and carrying capacity. Compared to 1.64 for the base drilling fluid, the results showed that the triazine, the drilling fluid of the present disclosure, and SourScav improved this ratio to 1.75, 1.79, and 1.95, respectively.

Figure 4A:
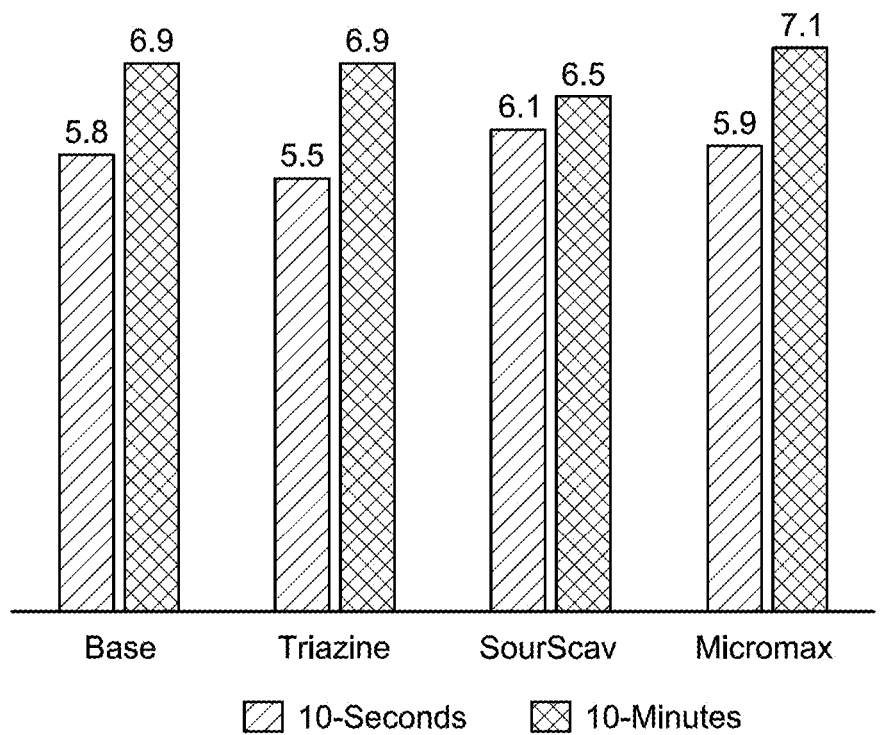
FIG. 4A depicts gel strength for various drilling fluids, according to certain embodiments.
Figure 4B:
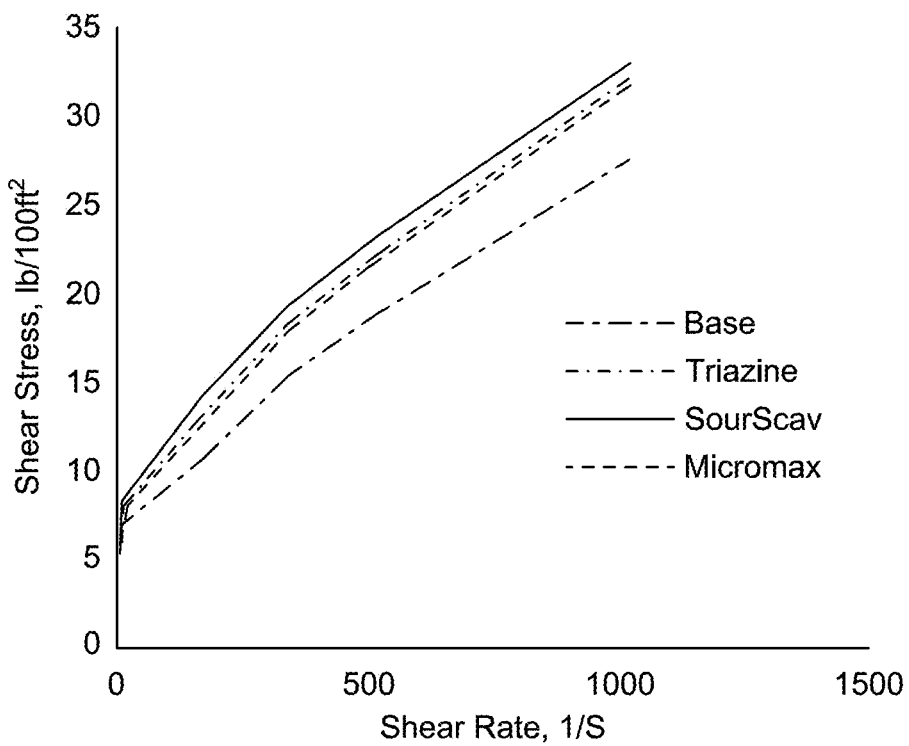
FIG. 4B depicts shear stress vs. shear rate curves for various drilling fluids, according to certain embodiments.

According to the obtained rheological properties, it indictaes that the triazine, SourScav-containing drilling fluids and the drilling fluid of the present disclosure satisfy the criteria of the aforementioned ranges with sufficient carrying capacities, as demonstrated by the YP/PV ratios. The influence of the scavenger addition on the drilling fluid's gel strength has also been studied. As presented in FIG. 4A, the values of 10-second/10-minute gel strengths for the tested drilling fluids were substantially close to each other, and the addition of scavengers had no discernible impact on the gel strengths of the base drilling fluid. The shear stress trend for the investigated fluid samples at low shear rates, as presented in FIG. 4B indicating the gel strengths.

The gel strength of a drilling fluid denotes its capacity for cuttings suspension under no circulation (static conditions). Higher gel strengths indicate a robust gelling structure and better solids suspension capacity, which help in solids settling mitigation; however, exceedingly high values cause ineffective solid control and fluid loss in addition to the increased torque and pressure once the circulation is broken. As a result, neither a low nor an overly high gel strength is recommended, and the 10-second/10-minute values should be, e.g., preferably less than 15/35 lb/100 ft².

Example 4: Filtration Performance

Figure 5:
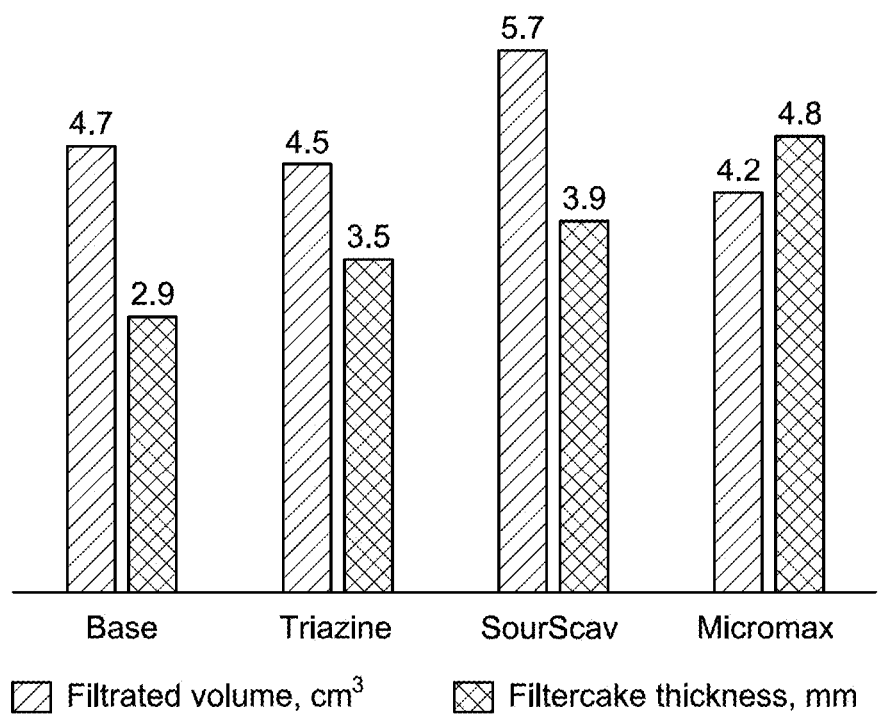
FIG. 5 depicts fluid loss and filter cake thickness for various drilling fluids, according to certain embodiments.

HPHT filtration test was performed to evaluate filtration parameters, including filtrate volume and filter cake thickness. As displayed in FIG. 5, the fluid loss after 30 minutes and filter cake thickness for base drilling fluid was, e.g., preferably about 4.7 cm³ and 2.9 mm, respectively. When triazine, SourScav, and the active Mn component of the drilling fluid of the present disclosure were added, the filter cake thickness increased to 3.5 mm, 3.9 mm, and 4.8 mm, respectively. Although the increment was less than 2 mm, it might marginally raise the potential of pipe sticking. A higher filter cake thickness with the active Mn component of the drilling fluid of the present disclosure was attributed to the solids content in the drilling fluid increased. The addition of scavengers slightly affected the fluid loss since the filtrate volume had been 4.5, 5.7, and 4.2 cm³ for triazine, SourScav, and the active Mn component of the drilling fluid of the present disclosure, respectively. The particle size and shape of the active Mn component of the drilling fluid of the present disclosure resulted in the reduction of the filtrate volume, which could result in fast plugging and, thus, help mitigate formation damage. The fluid losses for the prepared drilling fluids stayed below the recommended limit of 15 cm³, indicating that the materials utilized had no negative influence on the fluid loss.

Example 4: pH Measure

Figure 6:
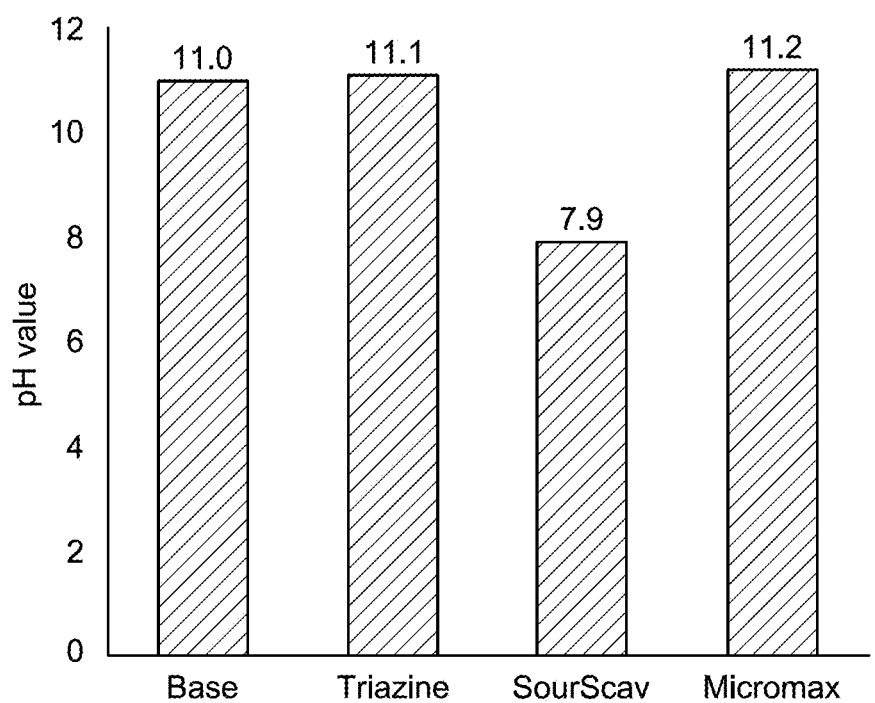
FIG. 6 depicts pH values of various drilling fluids, according to certain embodiments.

The values of pH for the base, triazine, SourScav-comprising fluids, and the drilling fluid of the present disclosure were 11.0, 11.1, 7.9, and 11.2, respectively (FIG. 6). The addition of triazine and the active Mn component of the drilling fluid of the present disclosure provided a minute increase in the pH of the base drilling fluid. On the other hand, introducing SourScav to the base fluid resulted in a reduction in pH. The low pH of SourScav (an iron gluconate-based product) and the generation of ferrous sulfide caused this substantial pH drop. The effective pH range for water-based drilling fluids is 9.0 to 11.0, although raising the pH further is beneficial to reduce the acidifying impact of $H_2S$. Certain regulations stipulate that the minimum pH level for drilling in sour environments is 10. The pH obtained using the drilling fluid of the present disclosure conforms with this regulation.

Example 5: Corrosion Investigation

Corrosion experiments showed that the corrosion rate of the base fluid is 9.0-6 lb/ft², whereas incorporating triazine, SourScav, and the drilling fluid of the present disclosure resulted in a nearly zero corrosion rate. The negligible corrosion rate in the presence of triazine, SourScav, and the drilling fluid of the present disclosure demonstrated the noncorrosive nature of these materials.

According to the present disclosure, the drilling fluid of the present disclosure can be used as an aqueous drilling fluid to scavenge hydrogen sulfide efficiently and outstandingly. The low-cost and environmentally benign nature of the drilling fluid of the present disclosure aids in lowering the expenses of safe drilling operations in sour environments. Additionally, the drilling fluid of the present disclosure has drilling fluid characteristics.

The drilling fluid of the present disclosure was utilized as an $H_2S$ scavenger to maximize the scavenging performance of the aqueous drilling fluids. The scavenging capability and influence on drilling fluid parameters were studied and compared with two commonly used commercial scavengers (i.e., triazine and SourScav®), yielding the following key findings. Triazine and SourScav increased the aqueous drilling fluid's ability to scavenge $H_2S$ by 179 and 131%, respectively, while using the drilling fluid of the present disclosure outperformed these commercial scavengers since the H$_2$S scavenging capacity was boosted by about 707%. The drilling fluid rheology was insignificantly affected by the use of the drilling fluid of the present disclosure and commercial scavengers and remained within the recommended practical ranges. The fluid loss after 30 minutes was slightly reduced in the presence of triazine and in the drilling fluid of the present disclosure, indicating faster plugging and less formation damage. Nevertheless, all used materials increased the filter cake thickness within a range of less than 2 mm, which may raise the risk of pipe sticking. The inclusion of triazine and the use of the drilling fluid of the present disclosure retained the pH values of the drilling fluid at 11.1 and 11.2, respectively, to preserve the 10-pH threshold for drilling in sour conditions. The limit was breached by SourScav to 7.9 pH. The near zero-corrosion rate obtained with triazine, SourScav, and the drilling fluid of the present disclosure showed the noncorrosive nature of these materials. When drilling oil and gas wells, H$_2$S gas is frequently encountered, which has severe health and safety repercussions since it endangers personnel, damages metallic equipment, and increases operating expenses. The drilling fluid of the present disclosure has oxidation and absorption capability, making it suitable as an H$_2$S scavenger for safe and efficient drilling operations. The drilling fluid of the present disclosure may provide an enhanced ability to scavenge H$_2$S and outperforms capacity for effective H$_2$S in-situ removal. For example, adding 1 g of the active Mn component of the drilling fluid of the present disclosure does not deteriorate the drilling fluid rheology and preserves the rheological characteristics within acceptable operational ranges. The addition of this little quantity of the active Mn component of the drilling fluid of the present disclosure has no significant influence on drilling fluid filtering performance. The drilling fluid of the present disclosure sustains the pH value over the minimum required 10-pH threshold for drilling in sour environments. The drilling fluid of the present disclosure is an eco-friendly and noncorrosive additive with a zero-corrosion rate. The drilling fluid of the present disclosure can safely drill vertical, deviated, horizontal, and multilateral wells because of its low cost, ecologically friendly nature, and competent drilling fluid properties. The drilling fluid of the present disclosure can be used for drilling oil, gas, and water wells with sour formations.

Numerous modifications and variations of the present disclosure are possible in light of the above teachings. It is therefore to be understood that within the scope of the appended claims, the invention may be practiced otherwise than as specifically described herein.

The invention claimed is:

1. A method for reducing hydrogen sulfide (H$_2$S) content of a H$_2$S-containing subterranean formation, the method comprising:

drilling the H$_2$S-containing subterranean formation to form a wellbore therein;

injecting a drilling fluid composition into the wellbore during the drilling and circulating the drilling fluid composition in the wellbore; and recovering a product stream from the H$_2$S-containing subterranean formation;

wherein the drilling fluid composition comprises 0.01 to 0.5 wt. % of manganese tetroxide, based on a total weight of the drilling fluid composition, and wherein the manganese tetroxide is in the form of spherical shaped particles having a D$_{50}$ average particle size in a range of from 0.5 to 2 µm, and a BET surface area of 2 to 3 m$^2$ per gram of the manganese tetroxide.

2. The method of claim 1, wherein the H$_2$S is present in the H$_2$S-containing subterranean formation at a concentration in a range of from 50 to 200 parts per million by volume, based on a total volume of the H$_2$S-containing subterranean formation.

3. The method of claim 1, having a H$_2$S breakthrough time of about 840 minutes.

4. The method of claim 1, wherein the drilling fluid composition has a H$_2$S absorption capacity of about 680 mg H$_2$S per liter of the drilling fluid composition.

5. The method of claim 1, wherein the product stream recovered from the H$_2$S-containing subterranean formation is substantially free of H$_2$S.

6. The method of claim 1, wherein the wellbore is at least one selected from the group consisting of a vertical well, a deviated well, a horizontal well, and a multilateral well.

7. The method of claim 1, wherein the H$_2$S-containing subterranean formation comprises an oil shale formation, a tar sands formation, a coal formation, and/or a conventional hydrocarbon formation.

8. The method of claim 1, wherein the drilling fluid composition further comprises
   (i) a base fluid, and
   (ii) an emulsifier, an anti-foaming agent, a fluid-loss additive, a viscosity modifier, a shale stabilizer, an alkali compound, a bridging agent, and/or a weighting agent.

9. The method of claim 1, wherein a temperature of the wellbore during the injecting and circulating is in a range of from 50 to 300° C.

10. The method of claim 1, wherein the drilling fluid composition further comprises a triazine, copper nitrate, iron sponge, and/or iron oxide.

11. The method of claim 1, wherein the drilling fluid composition further comprises:
   0.01 to 0.1 wt. % of an anti-foaming agent selected from the group consisting of polydimethylsiloxane, fatty acid ester, silicon dioxide, and vegetable oil;
   0.01 to 0.5 wt. % of a viscosity modifier selected from the group consisting of a clay, a saccharide, a polysaccharide, a cellulose, an acrylate polymer and copolymer, and a polyvinyl polymer and copolymer;
   0.5 to 5 wt. % of a fluid-loss additive selected from the group consisting of a starch, a starch derivative, a cellulose, and a cellulose derivative;
   5 to 15 wt. % of a shale stabilizer selected from the group consisting of a sodium salt, and a sulfonated asphalt;
   0.01 to 0.5 wt. % of an alkali compound selected from the group consisting of caustic soda, lime and soda ash;
   1 to 10 wt. % of a bridging agent selected from the group consisting of sodium borate, boric oxide, calcium carbonate, and magnesium oxide;
   5 to 15 wt. % of a weighting agent selected from the group consisting of calcium carbonate, barite, and hematite; and
   60 to 90 wt. % of a base fluid,
   each wt. % based on a total weight of the drilling fluid composition.

12. The method of claim 1, wherein the drilling fluid composition has a pH in a range of from 10 to 12.

13. The method of claim 1, wherein the drilling fluid composition has an apparent viscosity of about 20.8 cP.

14. The method of claim 1, wherein the drilling fluid composition has a plastic viscosity of about 10 cP.

15. The method of claim 1, wherein the drilling fluid composition has a yield point of about 17.5 lbs/100 ft$^2$.

16. The method of claim 1, wherein the drilling fluid composition has a gel strength value of 5 to 7 lb/100 ft$^2$.

17. The method of claim 1, wherein the wellbore contains a metal, and wherein a corrosion rate of the metal is less than $0.9 \times 10^{-5}$ lb/ft$^2$, as determined by American Petroleum Institute standard procedures API 653 and API 571.

\* \* \* \* \*